(12) United States Patent
Goto

(10) Patent No.: US 6,413,890 B1
(45) Date of Patent: *Jul. 2, 2002

(54) GLASS-CERAMIC SUBSTRATE FOR A MAGNETIC INFORMATION STORAGE MEDIUM

(75) Inventor: Naoyuki Goto, Sagamihara (JP)

(73) Assignee: Kabushiki Kaisha Ohara, Sagamihara (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/576,508

(22) Filed: May 23, 2000

Related U.S. Application Data

(60) Continuation of application No. 09/576,508, filed on May 23, 2000, now abandoned, which is a division of application No. 09/064,959, filed on Apr. 23, 1998, now Pat. No. 6,120,922.

(30) Foreign Application Priority Data

Apr. 28, 1997 (JP) ............................................. 9-124966

(51) Int. Cl.$^7$ ........................ C03C 10/04; C03C 10/14
(52) U.S. Cl. ........................ 501/5; 501/4; 428/694 ST; 428/694 SG
(58) Field of Search ................ 501/4, 5; 428/694 ST, 428/694 SG

(56) References Cited

U.S. PATENT DOCUMENTS 4,971,932 A * 11/1990 Alpha et al. .................. 501/3
5,273,834 A * 12/1993 Hoover et al. ......... 428/694 ST
5,391,522 A * 2/1995 Goto et al. .................... 501/4
5,561,089 A * 10/1996 Ishizaki et al. ............... 501/10
5,567,217 A * 10/1996 Goto et al. .................. 65/33.1
5,580,363 A * 12/1996 Goto et al. .................... 501/4
5,626,935 A * 5/1997 Goto et al. ................ 428/64.1
5,744,208 A * 4/1998 Beall et al. ............... 428/64.1
5,866,489 A * 2/1999 Yamaguchi .................... 501/4
5,868,953 A * 2/1999 Maekawa et al. ............... 501/4
5,872,069 A * 2/1999 Abe .............................. 501/5
5,972,816 A * 10/1999 Goto ............................ 501/4
5,985,777 A * 11/1999 Yamaguchi .................... 501/4
6,034,011 A * 3/2000 Yamaguchi et al. ........... 501/4
6,086,977 A * 7/2000 Suzuki et al. .................. 501/4
6,120,922 A * 9/2000 Goto .................... 428/694 ST

FOREIGN PATENT DOCUMENTS

| JP | 6295401 | 12/1993 |
| JP | 6092680 | 4/1994 |
| JP | 6329440 | 11/1994 |
| JP | 7157331 | 6/1995 |
| JP | 8221747 | 8/1996 |
| JP | 7300340 | 10/1996 |

\* cited by examiner

*Primary Examiner*—Karl Group
(74) *Attorney, Agent, or Firm*—Hedman & Costigan, P.C.

(57) ABSTRACT

A glass-ceramic substrate for a magnetic information storage medium includes, as predominant crystal phases, lithium disilicate ($Li_2O \cdot 2SiO_2$) and at least one selected from a group consisting of α-quartz (α-$SiO_2$), α-quartz solid solution (α-$SiO_2$ solid solution), α-cristobalite (α-$SiO_2$) and α-cristobalite solid solution (α-$SiO_2$ solid solution) and has a coefficient of thermal expansion of +65 to +130×10$^{-7}$/° C. at a temperature within a range from −50° C. to +70° C. and surface roughness (Ra) after polishing of 3 Å–9 Å.

5 Claims, 6 Drawing Sheets

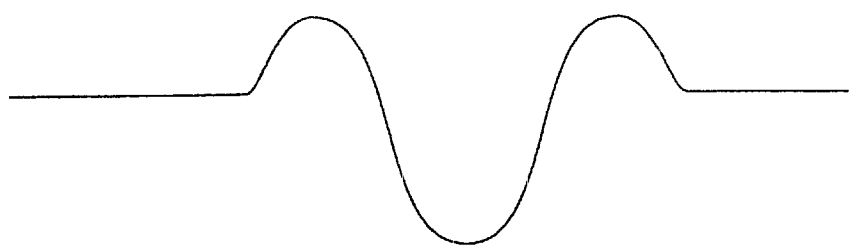
F I G. 2
F I G. 3

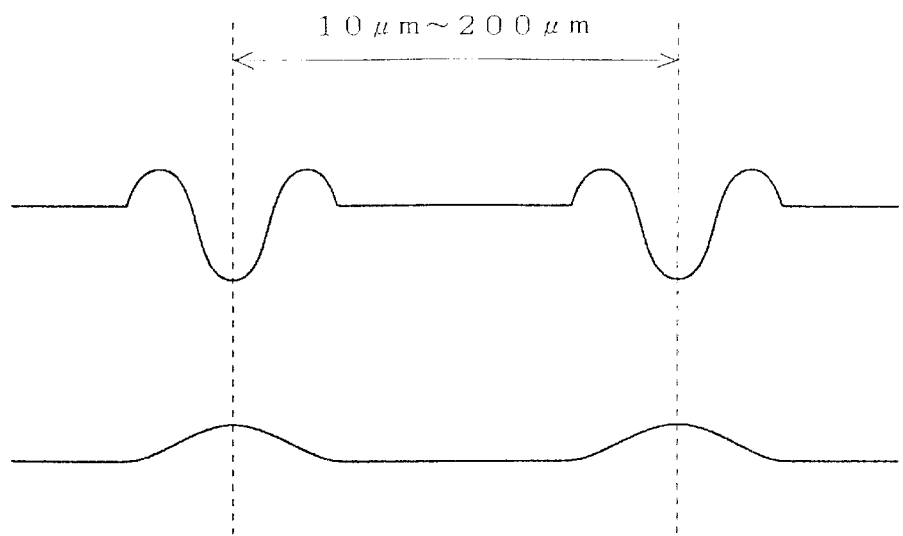
F I G. 4
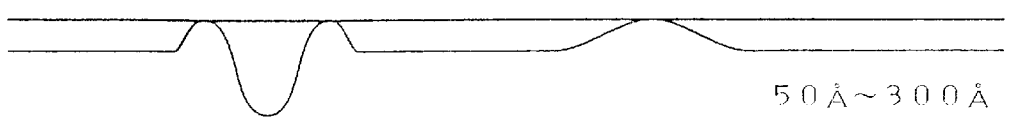
F I G. 5

GLASS-CERAMIC SUBSTRATE FOR A MAGNETIC INFORMATION STORAGE MEDIUM

The present application is a continuation of application Ser. No. 09/576,508, filed May 23, 2000, now abandoned, which is a divisional of application Ser. No. 09/064,959, filed Apr. 23, 1998, now U.S. Pat. No. 6,120,922.

BACKGROUND OF THE INVENTION

This invention relates to a glass-ceramic substrate for a magnetic information storage medium such as a magnetic disk and, more particularly, to a glass-ceramic substrate for a magnetic information storage medium having a super-flat substrate surface which is suitable for a near-contact recording system or a contact recording system and having also excellent surface characteristics in a landing zone of the substrate for preventing sticking of a magnetic head to a magnetic disk in the CSS (contact start and stop) recording system. The invention relates also to a magnetic information storage medium formed by subjecting the glass-ceramic substrate to a film forming process.

In the present specification, the term "magnetic information storage medium" denotes a disk-like magnetic information storage medium such as a hard disk used in a personal computer including a fixed type hard disk, a removal type hard disk and a card type hard disk and a disk-like magnetic information storage medium which can be used in a digital video camera or a digital camera.

There is an increasing tendency to utilizing a personal computer for multiple media purpose and using a digital video camera and a digital camera with resulting handling of a large amount of moving image and voice information and this tendency necessitates an information storage medium of a larger recording capacity. For this purpose, the bit number and track density of a magnetic information storage medium must be increased and the size of a bit cell must be reduced for increasing a longitudinal recording density. As for a magnetic head, it must be operated in closer proximity to the surface of the magnetic information storage medium in conformity with the reduction of the bit cell size. In a case where a magnetic head is operated at an extremely low flying height (i.e., in a near-contact state) or in a contact state against a magnetic information storage medium, there are provided, as a technique for start and stop of a magnetic information storage device, (1) the landing zone system according to which a landing zone is provided for performing the CSS (contact start and stop) operation therein in a particular portion of a magnetic information storage medium substrate (mainly an unrecorded portion in an inner peripheral side of the magnetic information storage medium) which is subjected to a processing for preventing sticking of a magnetic head (texturing processing) and (2) the ramp loading system according to which a magnetic head is in a stand-by state in a position outside of an outer periphery of a magnetic information storage medium when the magnetic information storage medium is at a standstill and, when the magnetic information storage medium has started, the magnetic head is shifted to a position above the magnetic information storage medium after starting of its rotation and lowered softly on the magnetic information storage medium and, when the magnetic information storage medium is to be stopped, the magnetic head is lifted while the magnetic information storage medium is rotating and then the magnetic head is shifted to the position outside of the outer periphery of the magnetic information storage medium.

In the CSS system, if the surface of contact of the magnetic head with the magnetic information storage medium is formed to a mirror surface to an exceeding degree, sticking of the magnetic head occurs during stoppage of the medium with the result that rotation of the medium is not started smoothly due to increase in friction and damage to the surface of the medium occurs. In contrast, in the ramp loading system in which a magnetic head is located in a position outside of the outer periphery of a magnetic information storage medium when the medium is at a standstill and rotation of the medium is started and the magnetic head is loaded on the medium only when the medium is rotating, an accurate operation control for loading the magnetic head is required but the landing zone required in the CSS system becomes unnecessary, so that a portion of the medium which is allotted to the landing zone can be utilized as a data zone and, therefore, the recording capacity of the medium can be increased. Further, according to the ramp loading system, damage to the surface of the medium at the start of rotation of the medium can be avoided.

As described above, in a magnetic information storage medium, two systems have been developed to cope with the conflicting demands for inputting and outputting of magnetic signals by a magnetic head at a low flying height or in a contact state necessitated by increase in the recording capacity and prevention of sticking of the magnetic head to the magnetic information storage medium. In either case, the data zone of a magnetic information storage medium must have a flatter surface than before and therefore a substrate for the magnetic information storage medium must also have a flatter surface than before. Further, development of a magnetic information storage media including a removal type hard disk and a card type hard disk in contrast to the conventional fixed type hard disk is under way along with development of a digital video camera and a digital camera and, as a result, higher characteristics including higher mechanical strength are required for a substrate of a magnetic information storage medium.

Aluminum alloy has been conventionally used as a material of a magnetic information storage medium substrate. The aluminum alloy substrate, however, tends to produce a substrate surface having projections or spot-like projections and depressions during the polishing process due to defects inherent in the material. As a result, the aluminum alloy substrate is not sufficient in flatness. Further, since an aluminum alloy is a soft material, deformation tends to take place so that it cannot cope with the recent requirement for making the magnetic information storage medium such as a magnetic disk thinner and the requirement for high density recording because the magnetic information storage medium tends to be deformed by contact with the magnetic head with resulting damage to the recorded contents.

As a material for overcoming this problem of the aluminum alloy substrate, known in the art are glass substrate for magnetic information storage medium made of a chemically tempered glass such as a sodium lime glass ($SiO_2$—$CaO$—$Na_2O$) and alumino-silicate glass ($SiO_2$—$Al_2O_3$—$Na_2O$). These glass substrates, however, have the following disadvantages:

(1) Polishing is made after chemical tempering and so the tempered layer tends to cause instability in thinning the magnetic information storage medium.

(2) For improving the CSS characteristics, the substrate must be subjected to texturing which produces projections and depressions on the surface of the substrate. Since a mechanical processing or a thermal processing such as by laser beam causes a cracking or other defects due to distortion in the chemically tempered layer, texturing must be conducted by a chemical etching or sputtering but this prevents a stable production of the product at a competitive cost.

(3) Since the $Na_2O$ ingredient is included as an essential ingredient in the glass, the magnetic thin film characteristics of the glass are adversely affected with the result that barrier coating over the entire surface of the glass becomes necessary for preventing elution of $Na_2O$ ingredient and this prevents stable production of the product at a competitive cost.

Aside from the aluminum alloy substrate and chemically tempered glass substrate, known in the art are some substrates made of glass-ceramics. For example, Japanese Patent Application Laid-open No. 6-329440 discloses a glass-ceramic of a $SiO_2$—$Li_2O$—$MgO$—$P_2O_5$ system which includes lithium disilicate ($Li_2O.2SiO_2$) and α-quartz (α-$SiO_2$) as predominant crystal phases. This glass-ceramic is an excellent material in that, by controlling the grain size of globular grains of α-quartz, the conventional mechanical texturing or chemical texturing becomes unnecessary and surface roughness (Ra) of a polished surface can be controlled within a range from 15 Å to 50 Å. This glass-ceramic cannot cope with the above described target surface roughness (Ra) of 1 Å to 5 Å and also cannot sufficiently cope with the above described tendency to lowering the flying height of a magnetic head necessitated by rapid increase in the recording capacity. Besides, in this glass-ceramic, no discussion about the landing zone to be described later in this specification is made at all.

Japanese Patent Application Laid-open No. 7-169048 discloses a photo-sensitive glass-ceramic of a $SiO_2$—$Li_2O$ system including Au and Ag as photo-sensitive metals characterized in that a data zone and a landing zone are formed on the surface of a magnetic disk substrate. A predominant crystal phase of this glass-ceramic is lithium silicate ($Li_2O.SiO_2$) and/or lithium disilicate ($Li_2O.2SiO_2$). In case lithium silicate is used, the glass-ceramic has a poor chemical durability so that it has a serious practical problem. Further, in forming of the landing zone, a part of the substrate (i.e., landing zone) is crystallized and is subjected to chemical etching by using 6% solution of HF. However, forming of the substrate with an uncrystallized part and a crystallized part makes the substrate instable mechanically as well as chemically. As for chemical etching by HF solution, it is difficult to control concentration of the HF solution because of evaporation and other reasons so that this method is not suitable for a large scale production of products.

Japanese Patent Application Laid-open No. 9-35234 discloses a magnetic disk substrate of a $SiO_2$—$Al_2O_3$—$Li_2O$ system in which predominant crystal phases consist of lithium disilicate ($Li_2O.2SiO_2$) and β-spodumene ($Li_2O.Al_2O_3.4SiO_2$). The predominant crystal phase of this glass-ceramic is β-spodumene which has a negative thermal expansion characteristic (as a result, the substrate has a low thermal expansion characteristic) and growth of crystal phases of the $SiO_2$ system such as α-quartz (α-$SiO_2$) and α-cristobalite (α-$SiO_2$) which have a positive thermal expansion characteristic (as a result, the substrate has a high thermal expansion characteristic) is restricted. It is described that this glass-ceramic provides a surface roughness (Ra) after polishing of 20 Å or below but surface roughness (Ra) disclosed in Examples is 12 Å to 17 Å which is not sufficient for the above described demand for a super flat surface and cannot cope with the tendency to a low flying height of a magnetic head necessitated by increase in the recording capacity. This glass-ceramic contains $Al_2O_3$ ingredient which is indispensable for growing of β-spodumene in the amount exceeding 5%. The material in which the crystal having a negative thermal expansion characteristic grows as a predominant crystal phase apparently produces an adverse effect in respect of difference in the coefficient of thermal expansion between the magnetic information storage medium and components of the information storage medium device. Besides, this glass-ceramic requires a high temperature of 820° C.–920° C. for crystallization and this prevents a large scale production of the product at a low cost.

International Publication WO97/01164 includes the above described Japanese Patent Application Laid-open No. 9-35234 and discloses a glass-ceramic for a magnetic disk in which the lower limit of $Al_2O_3$ ingredient in the above described composition system is lowered and the temperature for crystallization is lowered to 680° C.–770° C. The improvements of this glass-ceramic however are still insufficient in that the crystal phase of glass-ceramics of all examples is β-eucryptite ($Li_2O.Al_2O_3.2SiO_2$) which has a negative thermal expansion characteristic and therefore produces an adverse effect in respect of difference in the coefficient of thermal expansion between the magnetic information storage medium and components of the magnetic information storage medium device. In addition, these publications are characterized in that they do not substantially contain MgO ingredient.

Several methods are known for forming a landing zone and a data zone on the surface of a magnetic information storage medium. For example, Japanese Patent Application Laid-open No. 6-290452 discloses a method for forming a landing zone on a carbon substrate by a pulsed laser having a wavelength of 523 nm. In this case, however, there are the following problems:

(1) A carbon substrate is formed by pressing at a high pressure and burning at a high temperature of about 2600° C. with resulting difficulty in a large scale production at a low cost.

(2) A carbon substrate is low in its mechanical properties (Young's modulus and fracture strength) so that it is difficult to cope with the thinning tendency and a high speed rotation of a drive.

(3) The forming of the landing zone utilizes oxidation and evaporation of carbon by the pulsed laser. Since carbon is a material which causes a very strong thermal oxidation reaction, the formed landing zone becomes instable and thus it poses a serious problem in reproduceability.

Japanese Patent Application Laid-open No. 7-65359 and U.S. Pat. No. 5,062,021 disclose a method for forming a landing zone on an aluminum alloy by a pulsed laser. The aluminum alloy has the above described problems. Besides, the surface of the substrate after irradiation of laser beam tends to have a defect due to oxidation of a molten portion and remaining of splash of molten metal on the surface. It is therefore difficult to put this method to a practical use.

It is, therefore, an object of the invention to eliminate the above described disadvantages of the prior art and provide a glass-ceramic substrate for a magnetic information storage medium having excellent surface characteristics capable of realizing a stable flying height of a magnetic head in a landing zone where the contact start and stop of the magnetic head is performed and realizing inputting and outputting of magnetic signals at a low flying height or in a contact state of the magnetic head in a data zone (including the ramp loading system) satisfying the requirement for high recording density.

It is another object of the invention to provide a magnetic information storage medium made by forming a film of a magnetic medium on this glass-ceramic substrate.

SUMMARY OF THE INVENTION

Accumulated studies and experiments made by the inventor of the present invention for achieving the above described objects of the invention have resulted in the finding, which has led to the present invention, that in a $SiO_2$—$Li_2O$—$K_2O$—$MgO$—$ZnO$—$P_2O_5$—$Al_2O_3$—$ZrO_2$ system glass, a glass-ceramic for a magnetic information storage medium can be obtained which as, as its predominant crystal phases, lithium disilicate ($Li_2O.2SiO_2$) and at least one selected from a group consisting of α-quartz (α-$SiO_2$), α-quartz solid solution (α-$SiO_2$ solid solution), α-cristobalite (α-$SiO_2$) and α-cristobalite solid solution (α-$SiO_2$ solid solution), has a coefficient of thermal expansion within a particular range, has crystal grains of a fine globular grain structure, has surface characteristics with excellent flatness after polishing and has excellent processability with a $CO_2$ laser so that it is advantageous for forming a landing zone and a data zone on the surface of a magnetic information storage medium.

For achieving the objects of the present invention, there is provided a glass-ceramic substrate for a magnetic information storage medium comprising, as predominant crystal phases, lithium disilicate ($Li_2O.2SiO_2$) and at least one selected from a group consisting of α-quartz (α-$SiO_2$), α-quartz solid solution (α-$SiO_2$ solid solution), α-cristobalite (α-$SiO_2$) and α-cristobalite solid solution (α-$SiO_2$ solid solution) and having a coefficient of thermal expansion of +65 to +130×10$^{-7}$/° C. at a temperature within a range from −50° C. to +70° C. and surface roughness (Ra) after polishing of 3 Å–9 Å.

In one aspect of the invention, the glass-ceramic substrate is substantially free of $Na_2O$ and $PbO$.

In another aspect of the invention, crystal grains of the lithium disilicate are of a globular grain structure and have a grain diameter within a range of 0.05 μm–0.30 μm, crystal grains of the α-quartz and the α-quartz solid solution are of a globular grain structure each globular grain consisting of aggregated particles and have a grain diameter within a range of 0.10 μm–1.00 μm, and crystal grains of the α-cristobalite and the α-cristobalite solid solution are of a globular grain structure and have a grain diameter within a range of 0.10 μm–0.50 μm.

In another aspect of the invention, the glass-ceramic consists in weight percent of:

| | |
|---|---|
| $SiO_2$ | 70–80% |
| $Li_2O$ | 9–12% |
| $K_2O$ | 2–5% |
| $MgO$ + $ZnO$ | 1.2–5% |
| in which $MgO$ | 0.5–4.8% |
| $ZnO$ | 0.2–3% |
| $P_2O_5$ | 1.5–3% |
| $ZrO_2$ | 0.5–5% |
| $Al_2O_3$ | 2–5% |
| $Sb_2O_3$ + $As_2O_3$ | 0–2%. |

In another aspect of the invention, said glass-ceramic substrate is obtained by heat treating a base glass for producing a crystal nucleus under a temperature within a range from 450° C. to 550° C. for one to twelve hours and for crystallization under a temperature within a range from 680° C. to 800° C. for one to twelve hours and polishing the surface of the glass-ceramic substrate to a surface roughness of 3 Å–9 Å.

In another aspect of the invention, the glass-ceramic has a data zone and a landing zone, said landing zone having a multiplicity of projections or depressions formed by irradiation of $CO_2$ laser beam.

In another aspect of the invention, height of the projections or depressions formed is within a range from 50 Å to 300 Å, surface roughness (Ra) of the landing zone is within a range from 10 Å to 50 Å, and interval of the projections or depressions is within a range from 10 μm to 200 μm.

In another aspect of the invention, there is provided a magnetic information storage medium having a thin film of a magnetic media formed on said glass-ceramic substrate of claim 1 and having, if necessary, one or more of an undercoat layer, a medium layer, a protecting layer and a lubricating layer formed on said glass-ceramic.

BRIEF DESCRIPTION OF THE DRAWINGS

In the accompanying drawings,

FIG. 2 is a sectional view showing the shape of projections and depressions formed in the landing zone;

FIG. 3 is a sectional view showing the shape of projections formed in the landing zone;

FIG. 4 is a sectional view showing the interval of projections or depressions formed in the landing zone;

FIG. 5 is a sectional view showing the height of projections or depressions formed in the landing zone;

DETAILED DESCRIPTION OF THE INVENTION

Figure 1:
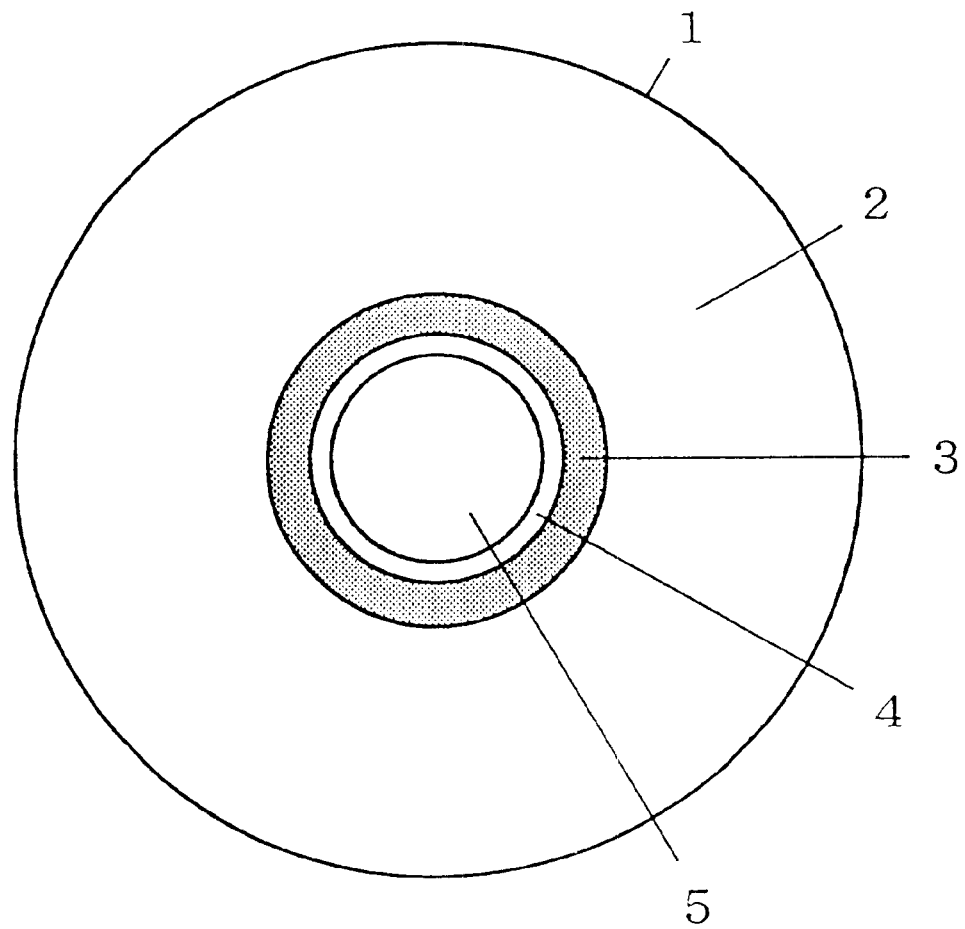
FIG. 1 is a top plan view of the state of a landing zone and a data zone formed outside of a central opening of an embodiment of the CSS type glass-ceramic substrate for a magnetic information storage medium according to the invention.

Reasons for limiting the predominant crystal phases and grain diameter and grain structure of crystal grains, a coefficient of thermal expansion, surface characteristics, composition, conditions of heat treatment and surface after texturing in the present invention will now be described in detail. The compositions of the glass-ceramic substrate of the invention is expressed on the basis of composition of oxides as in its base glass.

Predominant crystal phases should be lithium disilicate ($Li_2O.2SiO_2$) and at least one selected from a group consisting of α-quartz (α-$SiO_2$), α-quartz solid solution (α-$SiO_2$ solid solution), α-cristobalite (α-$SiO_2$) and α-cristobalite solid solution (α-SiO$_2$ solid solution). This is because the predominant crystal phase is an important factor in determining the coefficient of thermal expansion, mechanical strength, crystal structure and surface characteristics derived from the crystal structure and, for realizing the characteristics required for a substrate for a high density recording.

With the increase in the recording density, higher accuracy is required for positioning of the magnetic head and the magnetic information storage medium and, therefore, component parts of the medium device and the medium are required to have a highly accurate size. For this reason, an effect produced by the difference in the coefficient of thermal expansion between the component parts and the medium cannot be ignored and this difference in the coefficient of thermal expansion should be minimized. As component parts used for a small size magnetic information storage medium device such as a hard disk drive, those having a coefficient of thermal expansion in the order of +90 to +100×10$^{-7}$/° C. are generally used and, therefore, a substrate is also required to have a coefficient of thermal expansion of the same order. Depending upon the design of the magnetic information storage medium device, however, there arises a case where a material having a coefficient of thermal expansion of about +70 to about +125×10$^{-7}$/° C. which is outside of the above described range is used. For this reason, in the present invention, the coefficient of thermal expansion is within a range from +65 to +130×10$^{-7}$/° C. in a temperature range from −50° C. to +70° C. so that the glass-ceramic substrate can cope with various types of materials which can be used as components of the medium device while having regard to the mechanical strength by employing the specific crystal system.

The substrate is substantially free of Na$_2$O and PbO ingredients. The Na$_2$O ingredient contained in the material for the substrate causes a problem in realizing a highly accurate and fine magnetic film. Since Na ion significantly causes abnormal growth of grains of the magnetic film and reduction in the orientation of the magnetic film, presence of this ingredient in the substrate causes diffusion of the Na ion to the magnetic film during the film forming process resulting in the reduction of the magnetic characteristics. The PbO ingredient is undesirable from the standpoint of the environment protection and therefore use of this ingredient should be avoided.

If the height of projections or depressions in the surface of a landing zone (i.e., a portion where the magnetic head starts and stops its operation) in the CSS system is less than 50 Å, there is high likelihood of sticking of the magnetic head to the substrate due to increase in the contact resistance generated during stop-page of the magnetic head with resulting damage to the magnetic information storage medium or the magnetic head at the start of the magnetic head. If the surface of the substrate is a rough surface with projections or depressions having a height exceeding 300 Å, damage such as head crash will occur after starting of operation of the magnetic disk. For these reasons, the projections or depressions of the landing zone have a height within a range from 50 Å to 300 Å and the interval of the projections or depressions is within a range from 10 µm to 200 µm and the surface roughness (Ra) of the landing zone is controlled to a range from 10 Å to 50 Å.

Since there is the tendency to decreasing the flying height of the magnetic head to 0.025 µm or below. For coping with this requirement, the surface roughness (Ra) is within a range from 3 Å to 9 Å. In the ramp loading system, the entire surface of the substrate constitutes a data zone and, therefore, texturing is not made but the entire surface of the substrate should have the surface roughness (Ra) within the range from 3 Å to 9 Å.

For obtaining the glass-ceramic substrate having the above described flatness (3 Å to 9 Å in the data zone), the crystal grain and its structure are important factors. The desired surface roughness cannot be achieved if the crystal grains have a diameter which is larger or smaller than the diameter within the range defined in the claim. Since the crystal grains of the substrate according to the invention are globular, these crystal grains are exposed above the surface of the substrate after polishing and constitute an excellent surface which is smooth and is free of burr.

The above described content ranges of the respective ingredients have been selected for the reasons stated below.

The SiO$_2$ ingredient is a very important ingredient which, by heat-treating a base glass, forms lithium disilicate (Li$_2$O.2SiO$_2$), α-quartz (α-SiO$_2$), α-quartz solid solution (α-SiO$_2$ solid solution), α-cristobalite (α-SiO$_2$) and α-cristobalite solid solution (α-SiO$_2$ solid solution) crystals as predominant crystal phases. If the amount of this ingredient is below 70%, the crystals grown in the glass-ceramic are instable and its texture tends to become too rough whereas if the amount of this ingredient exceeds 80%, difficulty arises in melting and forming the base glass.

The Li$_2$O ingredient is also a very important ingredient which, by heat-treating the base glass, forms lithium disilicte (Li$_2$O.2SiO$_2$) as one of the predominant crystal phase. If the amount of this ingredient is below 9%, difficulty arises in growth of this crystal and also in melting of the base glass. If the amount of this ingredient exceeds 12%, the crystal obtained becomes instable and its texture tends to become too rough and, moreover, chemical durability is deteriorated.

The K$_2$O ingredient is an ingredient which improves the melting property of the glass and prevents the grown crystal from becoming too rough. If the amount of this ingredient is below 2%, these effects cannot be attained. If the amount of this ingredient exceeds 5%, the grown crystal becomes too rough, the crystal phase changes and chemical durability is deteriorated, diffusion to the film increases during the film forming process and abnormal growth of the film and reduction of the orientation of the film result.

The MgO and ZnO ingredients are important ingredients which have been found to grow the crystal grains of lithium disilicate, α-quartz, α-quartz solid solution, α-cristobalite and α-cristobalite solid solution which constitute the predominant crystal phases in the form of globular crystal grains. If the amount of the MgO ingredient is below 0.5%, the amount of the ZnO ingredient is below 0.2% and the total amount of these ingredients is below 1.2%, the above described effect cannot be achieved whereas if the amount of the MgO ingredient exceeds 4.8%, the amount of the ZnO ingredient exceeds 3% and the total amount of these ingredients exceeds 5%, it becomes difficult to obtain the desired crystal.

The P$_2$O$_5$ ingredient is indispensable as a nucleating agent of the glass. If the amount of this ingredient is below 1.5%, the nucleating effect is insufficient with the result that the crystal phase grown becomes too rough. If the amount of this ingredient exceeds 3%, devitrification occurs with the result that a large scale production of the product becomes difficult.

The ZrO$_2$ ingredient is an important ingredient which functions, like the P$_2$O$_5$ ingredient, as a nucleating agent of the glass and is very effective for attaining fine crystal grains, improving mechanical strength of the material and improving chemical durability. If the amount of this ingredient is below 0.5%, these effects cannot be attained whereas if the amount of this ingredient exceeds 5%, difficulty arises in melting of the base glass and a raw material such as $ZrSiO_4$ tends to be left unmolten.

The $Al_2O_3$ ingredient is an ingredient which improves chemical durability and hardness of the glass-ceramic. If the amount of this ingredient is below 2%, these effects cannot be attained whereas if the amount of this ingredient exceeds 5%, the melting property is deteriorated and devitrification occurs and the grown crystal phase changes to β-spodumene ($Li_2O.Al_2O_3.4SiO_4$). The growth of β-spodumene and β-cristobalite (β-$SiO_2$) significantly drops the coefficient of thermal expansion of the material and, therefore, growth of these crystal phases should be avoided.

The $Sb_2O_3$ and/or $As_2O_3$ ingredients may be added as a refining agent in melting of the glass. It will suffice if one or both of these ingredients are added up to the total amount of 2%.

In addition, the materials of the substrate are required to be free from defects such as anisotropy of crystal, foreign matters and impurities, to have a fine and uniform texture, and to have mechanical strength, high Young's modulus and surface hardness which are sufficient for standing a high speed rotation, contact with the magnetic head and a portable use as in a removable type storage device. The glass-ceramic substrate according to the present invention satisfies all of these conditions.

For manufacturing the glass-ceramic substrate for a magnetic information storage medium, the base glass having the above described composition is melted, is subjected to heat forming and/or cold forming, is heat treated for producing a crystal nucleus under a temperature within a range from 450° C. to 550° C. for one to twelve hours, and further is heat treated for crystallization under a temperature within a range from 680° C. to 800° C. for one to twelve hours.

The predominant crystal phases of the glass-ceramic thus obtained are lithium disilicate ($Li_2O.2SiO_2$) and at least one selected from a group consisting of α-quartz (α-$SiO_2$), α-quartz solid solution (α-$SiO_2$ solid solution), α-cristobalite (α-$SiO_2$) and α-cristobalite solid solution (α-$SiO_2$ solid solution). The crystal grains of the lithium disilicate are of a globular grain structure and have a grain diameter within a range of 0.05 μm–0.30 μm, crystal grains of the α-quartz and the α-quartz solid solution are of a globular grain structure each globular grain consisting of aggregated particles and have a grain diameter within a range of 0.10 μm–1.00 μm, and crystal grains of the α-cristobalite and the α-cristobalite solid solution are of a globular grain structure and have a grain diameter within a range of 0.10 μm–0.50 μm.

The glass-ceramic obtained by the above described heat treatment is subjected to conventional lapping and polishing processes and thereupon a glass-ceramic substrate for a magnetic information storage medium having a surface roughness (Ra) within a range from 3 Å to 9 Å is provided.

In the case of the landing zone system, the glass-ceramic is then subjected to the process of forming of projections or depressions in the landing zone by a $CO_2$ laser.

By irradiation of laser beam of this wavelength, projections or depressions having height within a range from 50 Å to 300 Å and a surface roughness (Ra) within a range from 10 Å to 50 Å are formed in the landing zone at an interval within a range from 25 μm to 250 μm. In FIG. 1, a glass-ceramic substrate 1 has a landing zone 3 provided outside of a central opening 5 and a data zone 2 provided outside of the landing zone 3. Reference character 4 designates a portion called "ring" formed inside of the landing zone 3. FIG. 2 shows a shape of projections or depressions formed in the landing zone. FIG. 3 shows a shape of projections formed in the landing zone. FIG. 4 shows interval of projections or depressions formed in the landing zone. FIG. 5 shows height of projections or depressions formed in the landing zone.

Lasers generally used for surface change such as cutting, welding and microprocessing of a material are classified to an Ar laser, a $CO_2$ laser, an eximer laser and a laser diode pumped solid-state laser.

It has been found that, in the laser processing for the glass-ceramic of the invention, the most suitable laser is the $CO_2$ laser. The Ar laser and excimer laser produce an unsuitable shape defect due to splashing of molten material.

For forming projections or depressions in the landing zone by the $CO_2$ laser, a polished glass-ceramic substrate is rotated in a state clamped by a spindle and pulsed laser beam is irradiated vertically on the surface of the landing zone at a predetermined interval.

In irradiating the pulsed laser, a spot diameter within a range from about 10 μm to about 50 μm is used. Laser irradiation conditions such as laser output and pulse width are controlled in accordance with the composition of the glass-ceramic under processing.

Principal conditions which affect forming of projections or depressions on the substrate surface by irradiation of laser beam are (1) laser output, (2) length of laser pulse and (3) laser spot diameter, i.e., the area of irradiation on the substrate surface. As to the material of the substrate which receives the laser irradiation, a melting point of glass and a melting point of crystal grown from the glass affect forming of projections or depressions. For example, in a general glass substrate which does not grow crystals, the melting point is lower than the glass-ceramic as shown in Table 1 and, when it is subjected to laser irradiation, the melted portion is so instable that it is difficult to control the shape of projections or depressions. Besides, distortion or microcrack due to thermal conditions takes place in a portion on which laser beam is irradiated and a portion on which the laser beam is not irradiated with the result that strength of the substrate is significantly reduced. On the other hand, in glass-ceramic substrates, there is much difference in the melting point depending upon the type of crystal grown. The glass-ceramic substrate according to the present invention has a higher melting point than a glass substrate and, for this reason, the shape of projections or depressions after irradiation of laser beam is very stable. In contrast, glass-ceramics of MgO—$Al_2O_3$—$SiO_2$ system, ZnO—$Al_2O_3$—$SiO_2$ system and $Li_2O$—$Al_2O_3$—$SiO_2$ system generally have a higher melting point than the glass-ceramic of the present invention as shown in Table 1 and, accordingly, these glass-ceramics must be processed with a high laser output and, besides, it becomes difficult to control the shape and size of projections or depressions to desired ones.

EXAMPLES

Examples of the present invention will be described.

Table 1 shows temperature for melting raw materials in manufacturing glass and glass-ceramics. Tables 2 to 5 show examples (No. 1 to No. 10) of compositions of a magnetic information storage medium substrate made according to the invention and two comparative examples of the prior art $Li_2O$—$SiO_2$ system glass-ceramics (Japanese Patent Application Laid-open No. Sho 62-72547, Comparative Example 1 and Japanese Patent Application Laid-open No. Hei 9-35234, Comparative Example 2) together with the temperature of nucleation, temperature of crystallization, crystal phase, grain diameter, shape of crystal grains, surface roughness (Ra) after polishing of the data zone, height of projections or depressions formed by irradiation of a $CO_2$ laser beam and surface roughness (Ra) of the landing zone

TABLE 1

| Composition System | Melting point (° C.) |
|---|---|
| $Al_2O_3$ – $SiO_2$ glass | 800–900 |
| MgO – $Al_2O_3$ – $SiO_2$ glass-ceramic | 1300–1400 |
| ZnO – $Al_2O_3$ – $SiO_2$ glass-ceramic | 1250–1350 |
| $Li_2O$ – $Al_2O_3$ – $SiO_2$ glass-ceramic | 1300–1400 |
| glass-ceramic of the present invention | 950–1150 |

TABLE 2

| | Examples | | |
|---|---|---|---|
| | 1 | 2 | 3 |
| $SiO_2$ | 76.5 | 76.5 | 76.5 |
| $Li_2O$ | 10.5 | 10.5 | 10.5 |
| $P_2O_5$ | 2.3 | 2.3 | 2.3 |
| $ZrO_2$ | 1.9 | 1.9 | 1.9 |
| $Al_2O_3$ | 3.5 | 3.5 | 3.5 |
| Mgo | 0.8 | 0.8 | 0.8 |
| ZnO | 0.5 | 0.5 | 0.5 |
| $K_2O$ | 3.8 | 3.8 | 3.8 |
| $Sb_2O_3$ | 0.2 | 0.2 | 0.2 |
| Nucleation temperature (° C.) | 540 | 540 | 540 |
| Crystallization temperature (° C.) | 760 | 760 | 780 |
| Predominant crystal phases, grain diameter (average), shape of crystal grains | lithium disilicate $Li_2Si_2O_5$ 0.1 μm globular α-quartz α-$SiO_2$ 0.1 μm globular aggregated particles | lithium disilcate $Li_2Si_2O_5$ 0.1 μm globular α-cristo-balite α-$SiO_2$ 0.3 μm globular | lithium disilicate $Li_2Si_2O_5$ 0.1 μm globular α-cristo-balite α-$SiO_2$ 0.3 μm globular α-quartz α-$SiO_2$ 0.3 μm globular aggregated particles |
| Coefficient of thermal expansion ($\times 10^{-7}$/° C.) ($-50°$ C. to $+70°$ C.) | 121 | 70 | 76 |
| Height of projections or depression (Å) | 130 | 180 | 100 |
| Surface roughness (Ra) of landing zone (Å) | 18 | 26 | 15 |
| Surface roughness (Ra) of data zone (Å) | 3 | 4 | 8 |

TABLE 3

| | Examples | | |
|---|---|---|---|
| | 4 | 5 | 6 |
| $SiO_2$ | 76.9 | 76.5 | 76.8 |
| $Li_2O$ | 10.5 | 10.5 | 10.5 |
| $P_2O_5$ | 2.5 | 2.3 | 2.0 |
| $ZrO_2$ | 2.5 | 2.0 | 1.9 |
| $Al_2O_3$ | 3.5 | 3.5 | 3.5 |
| Mgo | 0.6 | 1.0 | 0.8 |
| ZnO | 0.5 | 0.5 | 0.5 |
| $K_2O$ | 3.8 | 3.5 | 3.8 |
| $Sb_2O_3$ | 0.2 | 0.2 | 0.2 |
| Nucleation temperature (° C.) | 520 | 540 | 540 |
| Crystallization temperature (° C.) | 770 | 760 | 780 |
| Predominant crystal phases, grain diameter (average), shape of crystal grains | lithium disilicate $Li_2Si_2O_5$ 0.1 μm globular α-cristo-balite α-$SiO_2$ 0.3 μm globular | lithium disilcate $Li_2Si_2O_5$ 0.1 μm globular α-cristo-balite α-$SiO_2$ 0.3 μm globular | lithium disilicate $Li_2Si_2O_5$ 0.1 μm globular α-cristo-balite α-$SiO_2$ 0.3 μm globular α-quartz α-$SiO_2$ 0.3 μm globular aggregated particles |
| Coefficient of thermal expansion ($\times 10^{-7}$/° C.) ($-50°$ C. to $+70°$ C.) | 72 | 74 | 79 |
| Height of projections or depression (Å) | 100 | 200 | 120 |
| Surface roughness (Ra) of landing zone (Å) | 13 | 30 | 17 |
| Surface roughness (Ra) of data zone (Å) | 3 | 6 | 9 |

TABLE 4

| | Examples | | |
|---|---|---|---|
| | 7 | 8 | 9 |
| $SiO_2$ | 76.0 | 76.5 | 76.5 |
| $Li_2O$ | 11.0 | 10.0 | 10.5 |
| $P_2O_5$ | 2.0 | 2.3 | 2.4 |
| $ZrO_2$ | 1.9 | 1.9 | 1.5 |
| $Al_2O_3$ | 3.8 | 3.5 | 3.5 |
| Mgo | 1.0 | 1.3 | 0.8 |
| ZnO | 0.3 | 0.5 | 0.8 |
| $K_2O$ | 3.8 | 3.8 | 3.8 |
| $Sb_2O_3$ | 0.2 | 0.2 | 0.2 |
| Nucleation temperature (° C.) | 540 | 530 | 540 |
| Crystallization temperature (° C.) | 770 | 740 | 780 |
| Predominant crystal phases, grain diameter (average), shape of crystal grains | lithium disilicate $Li_2Si_2O_5$ 0.1 μm globular α-quartz α-$SiO_2$ 0.1 μm globular aggregated particles | lithium disilicate $Li_2Si_2O_5$ 0.1 μm globular α-cristo-balite α-$SiO_2$ 0.1 μm globular | lithium disilicate $Li_2Si_2O_5$ 0.1 μm globular α-quartz α-$SiO_2$ 0.2 μm globular aggregated particles α-quartz α-$SiO_2$ 0.3 μm globular aggregated particles |
| Coefficient of thermal expansion ($\times 10^{-7}$/° C.) ($-50°$ C. to $+70°$ C.) | 110 | 67 | 78 |
| Height of projections or depression (Å) | 80 | 100 | 100 |
| Surface roughness (Ra) of landing zone (Å) | 13 | 16 | 15 |
| Surface roughness (Ra) of data zone (Å) | 3 | 4 | 9 |

TABLE 5

| | Example | Comparative Examples | |
|---|---|---|---|
| | 10 | 1 | 2 |
| $SiO_2$ | 76.0 | 80.0 | 76.5 |
| $Li_2O$ | 10.5 | 8.2 | 10.5 |
| $P_2O_5$ | 2.5 | 2.5 | 2.3 |
| $ZrO_2$ | 2.2 | $Na_2O$ 1.0 | 1.9 |
| $Al_2O_3$ | 3.4 | 3.0 | 3.5 |
| Mgo | 0.9 | | 0.8 |
| ZnO | 0.4 | 1.0 | 0.5 |
| $K_2O$ | 3.9 | 3.5 | 3.8 |
| $Sb_2O_3$ | 0.2 | 0.3 | 0.2 |
| Nucleation temperature (° C.) | 560 | 540 | 540 |
| Crystallization temperature (° C.) | 770 | 800 | 780 |
| Predominant crystal phases, grain diameter (average), shape of crystal grains | lithium disilicate $Li_2Si_2O_5$ 0.1 µm globular α-cristobalite α-$SiO_2$ 0.3 µm globular α-quartz α-$SiO_2$ 0.3 µm globular aggregated particles | lithium disilcate $Li_2Si_2O_5$ 1.5 µm globular α-cristobalite α-$SiO_2$ 0.3 µm globular | lithium disilicate $Li_2Si_2O_5$ 0.1 µm globular α-cristobalite α-$SiO_2$ 0.3 µm globular |
| Coefficient of thermal expansion ($\times 10^{-7}/°$ C.) ($-50°$ C. to $+70°$ C.) | 75 | 60 | 61 |
| Height of projections or depression (Å) | 110 | | |
| Surface roughness (Ra) of landing zone (Å) | 16 | | |
| Surface roughness (Ra) of data zone (Å) | 4 | 12 | 11 |

For manufacturing the glass-ceramic substrates of the above described examples, materials including oxides, carbonates and nitrates are mixed and molten in a conventional melting apparatus at a temperature within the range from about 1350° C. to about 1450° C. The molten glass is stirred to homogenize it and thereafter formed into a disk shape and annealed to provide a formed glass. Then, this formed glass is subjected to heat treatment to produce the crystal nucleus under a temperature within the range from 450° C. to 550° C. for about one to twelve hours and then is subjected to further heat treatment for crystallization under a temperature within the range from 680° C. to 800° C. for about one to twelve hours to produce the desired glass-ceramic. Then, this glass-ceramic is lapped with lapping grains having average grain diameter ranging from 5 µm to 30 µm for about 10 minutes to 60 minutes and then is finally polished with cerium oxide having average grain diameter ranging from 0.5 µm to 2 µm for about 30 minutes to 60 minutes. Then, for forming of projections or depressions in the landing zone, the polished glass-ceramic substrate is subjected to the laser processing with a $CO_2$ laser fixed in position and pulsed laser being irradiated while the glass-ceramic substrate is rotated.

The irradiation of the $CO_2$ laser is performed with the condition such as laser wavelength, laser output, laser beam spot diameter, focus and laser pulse width etc. being controlled suitably in accordance with the specific composition of the glass-ceramic substrate.

As to the glass-ceramic substrates on which the landing zone was formed, the surface roughness (Ra) of the data zone and the landing zone and height of projections or depressions of the landing zone were measured with Zygo optical surface roughness analysis device.

Figure 6:
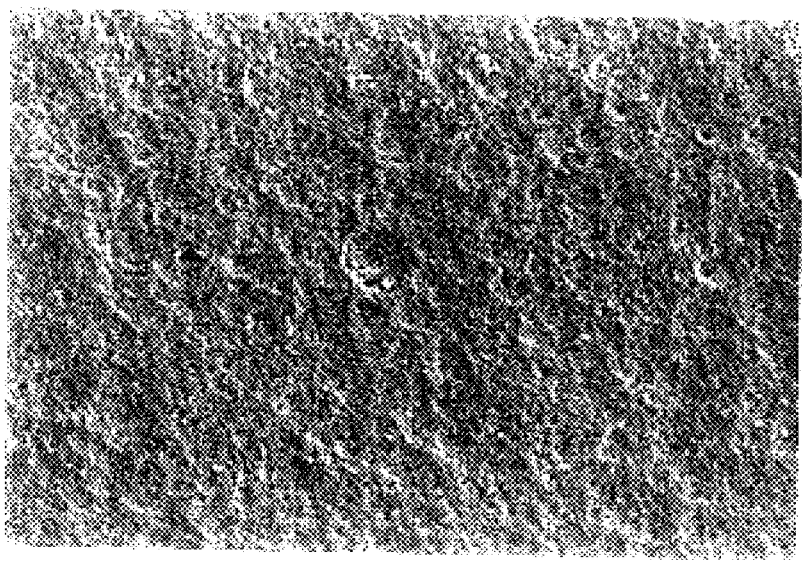
FIG. 6 shows an SEM (scanning electron microscope) image of the crystal structure of the glass-ceramic of Example 2 of the present invention after HF etching.
Figure 7:
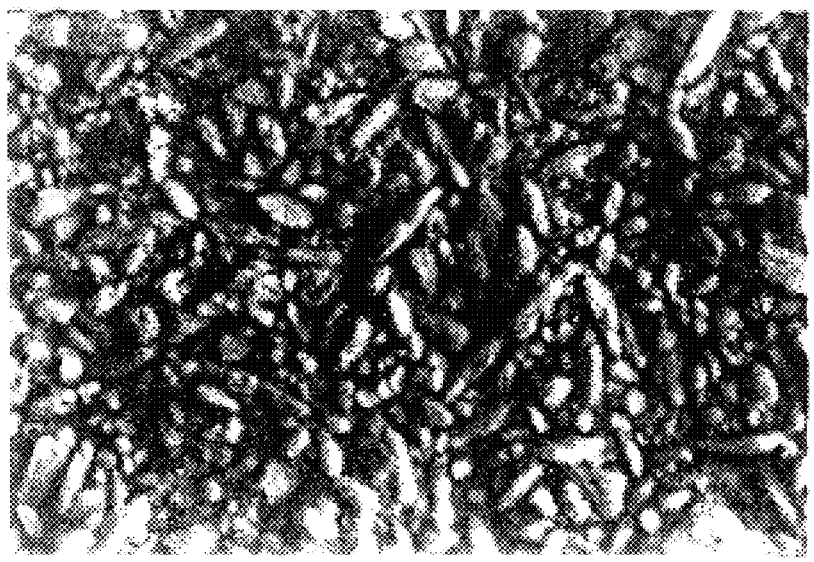
FIG. 7 shows an SEM image of the crystal structure of Comparative Example 1 of a prior art glass-ceramic after HF etching.

As shown in Tables 2 to 5 and FIGS. 6 and 7, the examples of the present invention and the comparative examples of the prior art $Li_2O$—$SiO_2$ system differ entirely from each other in the crystal grain diameter and the shape of the crystal grains. In the glass-ceramics of the present invention, lithium disilicate ($Li_2O.2SiO_2$) and at least one selected from a group consisting of α-quartz (α-$SiO_2$), α-quartz solid solution (α-$SiO_2$ solid solution), α-cristobalite (α-$SiO_2$) and α-cristobalite solid solution (α-$SiO_2$ solid solution) have a globular crystal grain structure (and consisting of aggregated particles in α-quartz) and a relatively small grain diameter. In contrast, in the glass-ceramics of the Comparative Example 1, the lithium disilicate crystal has an acicular grain structure with a large grain diameter of 1.0 µm or more. In a situation in which a smoother surface is required, this crystal grain structure and grain diameter of the comparative example adversely affect the surface roughness after polishing and produce defects due to coming off of the crystal grains from the substrate. Thus, it is difficult to obtain a surface roughness of 12 Å or less in the glass-ceramics of the Comparative Examples 1 and 2. Further, the glass-ceramic of the Comparative Example 2 contains β-cristobalite as a predominant crystal phase and is of a low thermal expansion characteristic with its coefficient of thermal expansion being $61 \times 10^{-7}/°$ C. exhibiting a relatively large difference in the coefficient of thermal expansion from component parts of the magnetic information storage medium device.

Figure 8:
FIG. 8 is an SEM image of the projections or depressions of Example 3 after irradiation of laser beam by a $CO_2$ laser.
Figure 9:
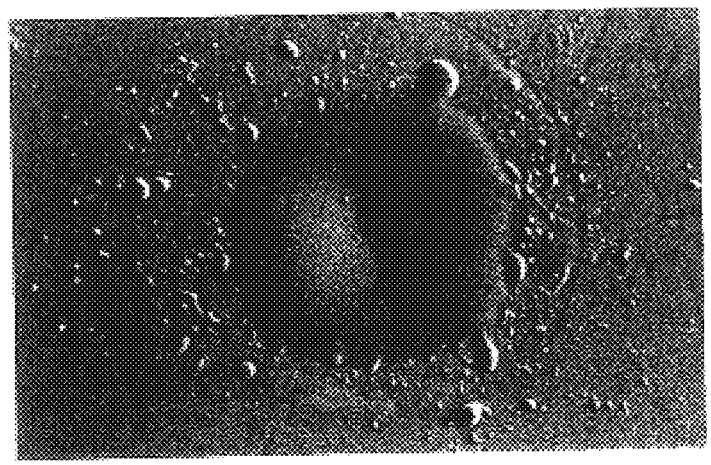
FIG. 9 is an SEM image of a prior art alumino-silicate chemically tempered glass after irradiation of laser beam by a $CO_2$ laser.

As regards the surface state obtained by a laser processing shown in FIGS. 8 and 9, a laser processing resulting in forming of projections or depressions having a uniform and desirable shape as shown in FIG. 8 can be realized in the glass-ceramic substrate according to the invention in contrast to the above described defects produced in the prior art aluminum substrate and chemically tempered glass substrate. As will be apparent from FIG. 9 showing the prior art chemically tempered glass ($SiO_2$—$Al_2O_3$—$Na_2O$, $K_2O$ ion exchange), the chemically tempered glass exhibits an instable and ununiform surface state after the processing by the laser.

It is considered that the glass-ceramic according to the invention is superior in resistance to heat to the chemically tempered glass which is in an amorphous state, has no strain change between the tempered surface layer and the untempered interior layer which is peculiar to the chemically tempered glass and has a crystal phase which can prevent growth of microcracks which are produced by various external actions and, as a total effect of these advantages, has the improved durability to irradiation of laser beam.

Magnetic disks as an example of the magnetic information storage medium were produced by forming, by DC sputtering, a Cr middle layer (80 nm), a Co-Cr magnetic layer (50 nm) and a SiC protective layer (10 nm) on the glass-ceramic substrates of the above described examples and then coating thereon a perfluoropolyether lubricant (5 nm). The magnetic disks thus obtained were capable of reducing the flying height of the magnetic head than the prior art magnetic disks. Further, inputting and outputting of magnetic signals were made with the magnetic head in contact with the magnetic disk in the ramp loading system without causing damage to the magnetic head or magnetic disk.

Figure 10:
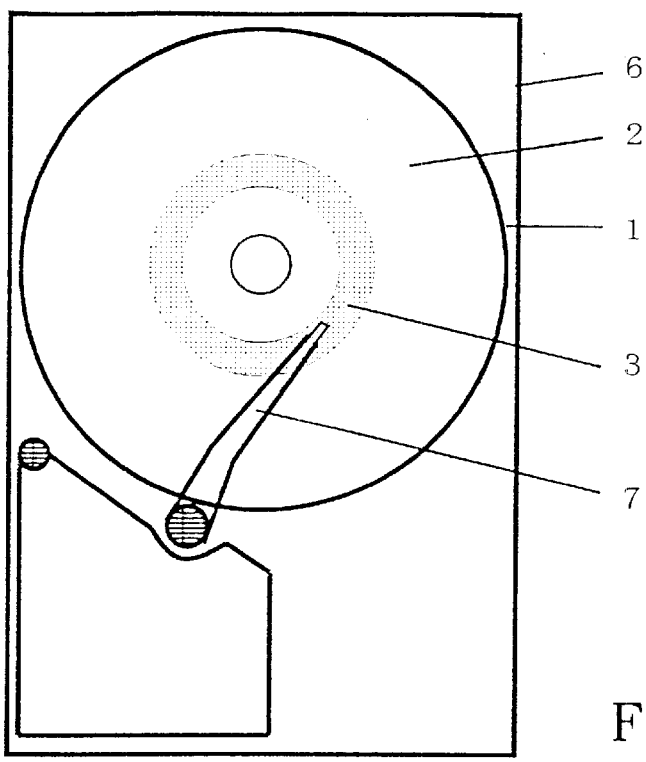
FIG. 10 is a schematic view showing an information storage device of the landing zone system in which start and stop of a magnetic head are made in the landing zone.

FIG. 10 shows an information storage medium device (e.g., a hard disk device of a personal computer) of the landing zone system as an example of employing the magnetic information storage medium according to the invention.

In FIG. 10, a magnetic information storage medium 1 has a data zone 2 and a landing zone 3. The magnetic information storage medium 1 is rotatably mounted on an information storage medium device 6. A magnetic head 7 is pivotably mounted on the magnetic information storage device 6. The magnetic head 7 starts in the landing zone 3, performs recording or reproduction of data in the data zone 2 in a low flying height state or in a contact state and thereafter returns to the landing zone 3 and stops.

The examples of the magnetic information storage medium substrate of the landing zone system may be used, without being subjected to the processing for forming the landing zone by the laser, as a magnetic information storage medium substrate of the ramp loading system.

Figure 11:
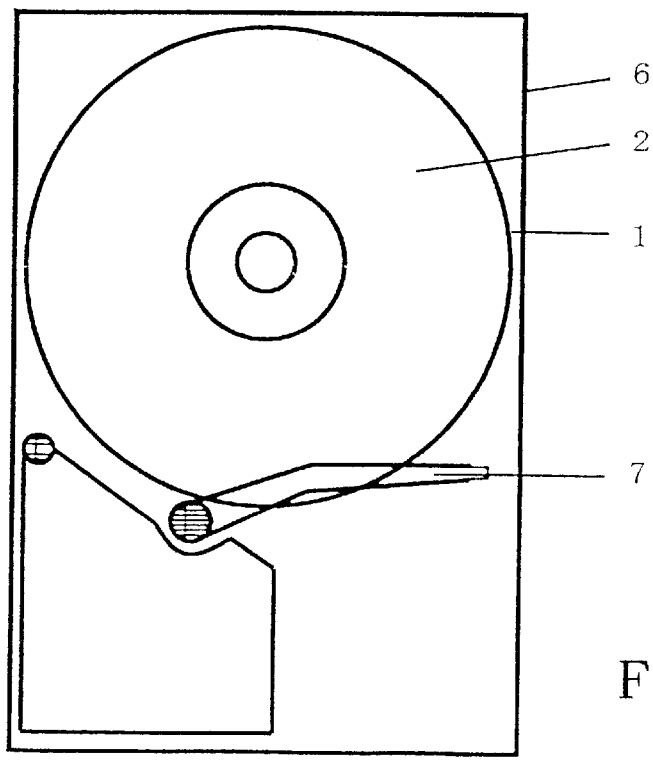
FIG. 11 is a schematic view showing an information storage device of the ramp loading system in which start and stop of a magnetic head are made in an area outside of the magnetic information storage medium.

FIG. 11 shows an information storage medium device (e.g., a hard disk device of a personal computer) using a magnetic information storage medium of the ramp loading system.

In FIG. 11, the same component parts as those shown in FIG. 10 are designated by the same reference characters and description thereof will be omitted. In this system, start and stop of the magnetic head 7 are made in an area which is outside of the illustrated magnetic information storage medium 1. More specifically, the magnetic head 7 starts in the area which is outside of the illustrated information storage medium 1, performs recording or reproduction of data in the data zone 2 in a low flying height state or in a contact state, and thereafter returns to the area outside of the information storage medium 1 and stops.

What is claimed is:

1. A glass-ceramic substrate for a magnetic information storage medium comprising, as predominant crystal phases, lithium disilicate ($Li_2O.2SiO_2$) and at least one selected from a group consisting of α-quartz (α-$SiO_2$), α-quartz solid solution (α-$SiO_2$ solid solution), α-cristobalite (α-$SiO_2$) and α-cristobalite solid solution (α-$SiO_2$ solid solution) and having a coefficient of thermal expansion of +65 to +130×$10^{-7}$/° C. at a temperature within a range from −50° C. to +70° C. and surface roughness (Ra) after polishing of 3 Å–9 Å.

2. Glass-ceramic comprising, as predominant crystal phases, lithium disilicate ($Li_2O.2SiO_2$) and at least one selected from the group consisting of α-quartz (α-$SiO_2$), α-quartz solid solution (α-$SiO_2$ solid solution), α-cristobalite (α-$SiO_2$) and α-cristobalite solid solution (α-$SiO_2$ solid solution) and having a coefficient of thermal expansion of +65 to +130×$10^{-7}$/° C. at a temperature within a range from −50° C. to +70° C., crystal grains of the lithium disilicate having a grain diameter within a range of 0.05 μm–0.30 μm, crystal grains of the α-quartz (α-$SiO_2$) and the α-quartz solid solution (α-$SiO_2$ solid solution) having a grain diameter within a range of 0.10 μm–1.00 μm, and crystal grains of the α-cristobalite (α-$SiO_2$) and the α-cristobalite solid solution (α-$SiO_2$ solid solution) having a grain diameter within a range of 0.10 μm–0.50 μm and having a surface roughness (Ra) after polishing of 3–9 Å.

3. Glass-ceramic as defined in claim 2 which is substantially free of $Na_2O$ and PbO.

4. Glass-ceramic as defined in claim 2 wherein the glass-ceramic consists in weight percent of:

| | |
|---|---|
| $SiO_2$ | 70–80% |
| $Li_2O$ | 9–12% |
| $K_2O$ | 2–5% |
| MgO + ZnO | 1.2–5% |
| in which MgO | 0.5–4.8% |
| ZnO | 0.2–3% |
| $P_2O_5$ | 1.5–3% |
| $ZrO_2$ | 0.5–5% |
| $Al_2O_3$ | 2–5% |
| $Sb_2O_8 + As_2O_3$ | 0–2% |

5. Glass-ceramic as defined in claim 4 wherein said glass-ceramic is obtained by heat treating a base glass for producing a crystal nucleus under a temperature within a range from 450° C. to 550° C. for one to twelve hours and for crystallization under a temperature within a range from 680° C. to 800° C. for one to twelve hours.

* * * * *